United States Patent [19]

Charlier et al.

[11] Patent Number: 5,420,759

[45] Date of Patent: May 30, 1995

[54] SUPPORT ASSEMBLY FOR CARD MEMBER HAVING A MEMORY ELEMENT DISPOSED THEREUPON

[75] Inventors: Michael L. Charlier, Arlington Heights; David W. Trahan; John A. Kalenowsky, both of Palatine, all of Ill.

[73] Assignee: Motorola, Inc., Schaumburg, Ill.

[21] Appl. No.: 927,706

[22] Filed: Aug. 10, 1992

[51] Int. Cl.⁶ .............................................. H05K 7/00
[52] U.S. Cl. .................... 361/814; 455/347; 455/351; 361/837; 361/752
[58] Field of Search ............... 361/736, 752, 814, 815, 361/684, 737; 330/66, 65; 331/187; 455/347, 351

[56] References Cited

U.S. PATENT DOCUMENTS

| 3,777,221 | 12/1973 | Tatusko et al. | 174/68.5 |
| 4,727,246 | 2/1988 | Hara et al. | 361/737 |
| 4,843,225 | 6/1989 | Hoppe | 235/492 |
| 4,985,601 | 1/1990 | Hagner | 361/401 |

FOREIGN PATENT DOCUMENTS

0475210A2 8/1991 European Pat. Off. .

WO92/05513 4/1992 WIPO .

Primary Examiner—Bot L. Ledynh
Attorney, Agent, or Firm—Daniel W. Juffernbruch

[57] ABSTRACT

A support assembly, and associated method, for permitting a reduced-sized, card member to be received by a standard-sized, card reader assembly of a radio telephone. The support assembly is comprised of a frame formed of a standard-sized, card member having a through-hole extending therethrough. The through-hole is of dimensions corresponding to the card member of the reduced dimensions. A thin, support sheet covers a portion of an opening formed by the through-hole on a top surface of the frame to form a front joist thereby, and the thin, support sheet is folded about an edge of the frame similarly to form a rear joist over an opening formed upon a bottom face surface of the frame by the through-hole. The front joist and the rear joist together form a pocket for supporting the card member of the reduced dimensions within the through-hole. Once the card member of the reduced dimensions is inserted within the through-hole, the support assembly may be inserted into a card reader assembly constructed to be operative to receive the standard-sized card member.

13 Claims, 3 Drawing Sheets

SUPPORT ASSEMBLY FOR CARD MEMBER HAVING A MEMORY ELEMENT DISPOSED THEREUPON

BACKGROUND OF THE INVENTION

The present invention relates generally to support assemblies, and, more particularly, to a support assembly for permitting a reduced-sized, card member to be received by a standard-sized, card-receiving apparatus.

A communication system is operative to transmit information between two or more locations, and includes, at a minimum, a transmitter and a receiver interconnected by a communication channel. A radio communication system is a communication system in which the communication channel comprises a radio frequency channel wherein the radio frequency channel is defined by a range of frequencies of the communication spectrum.

The transmitter which forms a portion of the radio communication system includes circuitry for converting the information into a form suitable for transmission thereof upon a radio frequency channel. Such circuitry includes modulation circuitry which performs a process referred to as modulation. In such a process, the information which is to be transmitted is impressed upon a radio frequency electromagnetic wave, commonly referred to as a carrier signal. The resultant signal, formed of a combination of the carrier signal and the information, is commonly referred to as a modulated signal. Such resultant signal is also referred to as a communication signal as the modulated signal includes the information which is to be communicated between the transmitter and the receiver.

Various modulation schemes are known for impressing the information upon the carrier signal to form thereby the communication signal. For instance, amplitude modulation, frequency modulation, phase modulation, said combinations thereof are all modulation schemes by which information may be impressed upon a carrier wave to form the communication signal.

Radio communication systems are advantageous in that no physical interconnection is required between the transmitter and the receiver; once the information signal is modulated to form a modulated signal, the modulated signal may be transmitted over large distances.

Additionally, numerous modulated signals may be simultaneously transmitted at different frequencies of the electromagnetic frequency spectrum. Transmission of communication signals on frequency channels defined upon certain frequency bands of the electromagnetic frequency spectrum is regulated by regulatory bodies.

A two-way, radio communication system is a radio communication system, similar to the radio communication system above-described, but which further permits both transmission of information to a location, and transmission of information from that location. Each location of such two-way radio communication system contains both a transmitter and a receiver. The transmitter and the receiver positioned at a single location typically comprise a unit referred to as a radio transceiver, or, more simply, a transceiver.

A cellular communication system is one type of two-way radio communication system in which communication is permitted with a radio transceiver positioned at any location within a geographic area encompassed by the cellular communication system.

A cellular communication system is created by positioning a plurality of fixed-site radio transceivers, referred to as base stations, at spaced-apart locations throughout the geographic area. The base stations are connected to a conventional, wireline, telephonic network. Each base station has associated therewith a portion of the geographic area located proximate to each of such base stations. Such portions are referred to as cells. The plurality of cells, each defined by corresponding ones of the base stations of the plurality of base stations, together define the coverage area of the cellular communication system.

A radio transceiver, referred to in a cellular communication system as a radio telephone, positioned at any location within the coverage area of the cellular communication system is able to communication with a user of the conventional, wireline, telephonic network by way of a base station. Modulated signals are transmitted between the radio telephone and the base station to effectuate communication therebetween.

New designs of radio telephones operative in a cellular communication system include new innovations which increase the convenience of use of such radio telephones. An assembly referred to as a card reader assembly constitutes one such innovation included in the designs of several new constructions of radio telephones.

A card reader assembly comprises structure forming a receiving platform and electrodes positioned in proximity to the receiving platform. The electrodes are also coupled to other structure of the radio telephone and are operative to form an electrical connection with corresponding electrodes of a memory element when such memory element is positioned at the receiving platform of the card reader assembly.

Identification indicia is stored in the memory element such identification indicia typically includes an identification member to be utilized for billing purposes to bill a phone call made with the radio telephone to a particular billing account.

The memory element is typically disposed upon a card member and the electrodes of the memory element are disposed upon a face surface of such card member. The card member is operative not only to support the memory element and the electrodes, but also to align to electrodes of the memory element with the electrodes of the card reader assembly when the card member is positioned at the receiving platform.

When the electrodes are suitably aligned with one another, thereby to connect the memory element with the circuitry of the radio telephone, the information stored within the memory element may be transferred to the circuitry of the radio telephone.

Because the card member may be removed from a card reader assembly of one radiotelephone, and inserted within the card reader assembly of another radiotelephone, calls made from more than one radiotelephone may be billed to a single billing account.

Radiotelephone constructions having card reader assemblies incorporated therein are advantageous, as a user of more than one radiotelephone may alternately operate the two or more radiotelephones while requiring only a single billing account.

Standardization of the size of the card member as well as the locations at which the electrodes are located on the face surface thereof is required so that the card member may be inserted into the card reader assembly and so that, once positioned at the receiving platform, the electrodes of the card member align with corresponding electrodes of the card reader assembly. The construction of the card reader assembly must be correspondingly standardized.

In standard configurations, the electrodes formed upon the face surface of the card member are arranged in an array of two rows, each of three electrodes (i.e., a two by three array of electrodes).

However, at least two standard configurations of card-member dimensions exist. A first standardized configuration of card member, sometimes referred to as a C-Net-sized card member (as specified in the International Standard, ISO 7816, parts one through three), defines dimensions of the card member to correspond generally to the physical dimensions of a conventional credit card. Such card member shall, at times, hereafter be referred to as a standard-sized card member. The electrodes of the memory element are disposed at standardized locations upon a face surface of such card member to permit alignment of the electrodes with a corresponding electrodes of the card reader assembly once the card member is inserted into the card reader assembly to be supported at the receiving platform thereof.

A second, standardized configuration of card member, sometimes referred to as a D-Net-sized card member (as specified in the International Standard, ISO 7816, parts one through three), defines dimensions of the card member to be of a much-reduced length and width relative to that of the C-Net-sized card member. The thickness of the D-Net-sized card member, however, is substantially similar to that of the C-Net sized card member. Such card member shall, at times, hereinafter be referred to as a card member of reduced dimensions. Again, the electrodes of the memory element are disposed at standardized locations upon a face surface of such card member to permit alignment of the electrodes with corresponding electrodes of a card reader assembly operative to receive such a card member.

The arrangement of the electrodes of the memory elements of both standardized configurations of card members are similar in that the electrodes are arranged in a two by three array of electrodes. However, because the dimensions of the two different configurations of card members are otherwise dissimilar, a card member of one of the standardized configurations generally cannot be utilized in a card reader assembly constructed to receive the other of the configurations of the card members.

While a card member of the smaller dimensions can be inserted into a card reader assembly operative to receive a card member of the larger dimensions, alignment of the electrodes of the memory element and of the card reader assembly can only be effected with some difficulty. Because of the smaller dimensions of the card member of the reduced dimensions, no alignment function is performed by such card member.

Because existing card members of the two different standardized configurations are essentially incompatible, a user must have separate card members, each containing a separate billing number to ensure that such user shall be able to operate a radio telephone having either type of card reader assembly. Such need for separate billing numbers significantly increases the costs required to operate such phones.

What is needed, therefore, is apparatus permitting a card member of the reduced dimensions (e.g., a D-Net-sized card member) configuration to be operative in either a card reader constructed to receive a card member of such reduced dimensions or a card reader assembly constructed to receive a card member of the larger dimensions (e.g., a C-Net-sized card member).

SUMMARY OF THE INVENTION

The present invention, accordingly, advantageously provides apparatus which permits a card member of the reduced dimensions to be utilized in a card reader assembly constructed to receive a card member of the larger dimensions.

The present invention provides further advantages and features, the details of which will become more readily apparent when reading the following detailed description of the preferred embodiments.

In accordance with the present invention, therefore, a support assembly, and associated method, for supporting an electrical circuit disposed upon a card wafer is disclosed. The card wafer is of outer perimetal dimensions, and the electrical circuit disposed thereupon has coupling electrodes disposed upon a face surface of the card wafer. A frame is formed of a card member defining a front face surface and a rear face surface. A through-hole, defined by opposing inner sidewalls of opposing side portions of the card member, extends at least a portion of the distance between the front face surface and the rear face surface of the card member thereby to form an opening upon at least the front face surface of the card member. The opposing side portions of the card member together define an inner perimeter. The inner perimeter is of dimensions corresponding to, but slightly greater than, the outer perimetal dimensions of the card wafer to permit, thereby, positioning of the card wafer within the through-hole such that the face surface of the card wafer upon which the coupling electrodes are formed is positioned at the front face surface of the card member. A front joist is positioned upon the front face surface of the card member forming the frame. The front joist covers at least a portion of the opening formed upon the front face surface by the through-hole extending through the card member and supports, thereby, the card wafer in position when the card wafer is positioned within the through-hole.

BRIEF DESCRIPTION OF THE DRAWINGS

The present invention will be better understood when read in light of the accompanying drawings in which.

DESCRIPTION OF THE PREFERRED EMBODIMENTS

At the outset, it should be noted that, while the following description of the preferred embodiments are described in connection with a support assembly of physical dimensions corresponding to the physical dimensions of the aforementioned C-Net card member defined in the International Standard, ISO 7816, parts one through three, and such support assembly is here used to support a D-Net-sized card member, as defined in the International Standard, ISO 7816, parts one through three, a support assembly constructed according to the teachings of the present invention may, of course, be constructed to be of other dimensions and be constructed to support other sizes of card members.

Figures 1, 2:
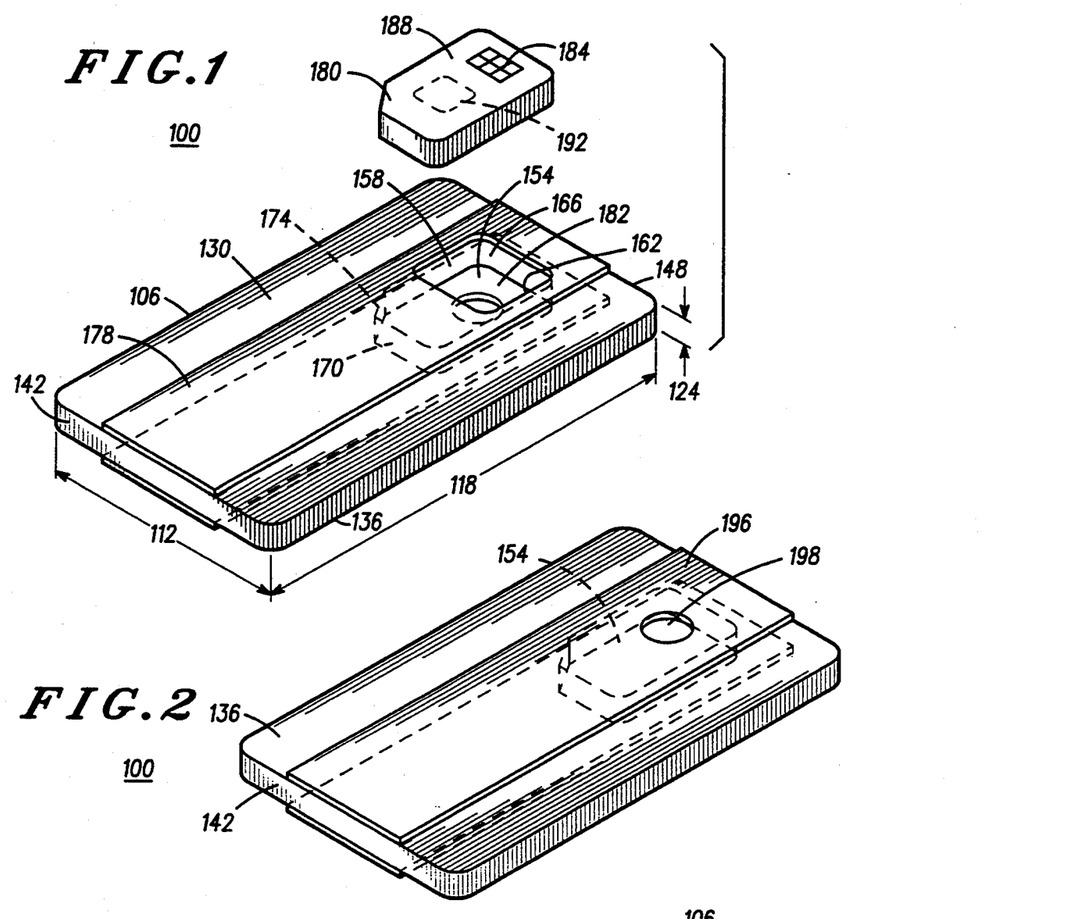
FIG. 1 is a perspective view taken from above the support assembly of a preferred embodiment of the present invention and of a card member or reduced dimensions positioned above the support assembly.
FIG. 2 is a perspective view taken from beneath the support assembly shown in FIG. 1.

Turning first then to the perspective view of FIG. 1, a support assembly, referred to generally by reference numeral 100, of a preferred embodiment of the present invention is shown. Support assembly 100 includes frame 106 formed of a card member, here of a thermoplastic material. The physical dimensions of the card member forming frame 106 are defined in terms of a width, indicated by line segment 112, a length, indicated by line segment 118, and a thickness, indicated by the gap separating arrows 124. In the preferred embodiment, the width, length, and thickness of the card member forming frame 106 correspond to the dimensions of the C-Net-sized card member defined in the aforementioned, International Standard, ISO 7816, parts one through three.

Frame 106 defines top face surface 130, bottom face surface 136, and four edge surfaces, including opposing edge surfaces 142 and 148.

Through-hole 154 is formed to extend between top face surface 130 and bottom face surface 136 of frame 106. The dimensions of through-hole 154 are defined by inner sidewalls 158, 162, 166, and 170 of opposing side portions of the card member comprising frame 106. The perimeter of through-hole 154 defined by opposing sidewalls 158-162 and 166-170, respectively, correspond to the length and width of the aforementioned D-Net card member defined in the International Standard, ISO 7816, parts one through three.

Through-hole 154, which extends between top face surface 130 and bottom face surface 136 of the card member forming frame 106, defines openings on both top face surface 130 and bottom face surface 136.

Sidewalls 158 and 170 do not intersect at a perpendicular angle; rather, an angled-portion of sidewall 158 intersects with sidewall 170, thereby to form a notched-edge, here designated by reference numeral 174.

A front joist, formed of a thin sheet of thermoplastic, or teflon (tm)-coated, material and referred to by reference numeral 178, is placed upon top face surface 130 of frame 106. Front joist 178 covers a portion of the opening formed upon top face surface 130 by through-hole 154. In the preferred embodiment illustrated in the Figure, the thin sheet of material forming front joist 178 extends along the entire length of top face surface 130 and is folded about edge surface 148. As will be shown in FIG. 2, the thin sheet which forms front joist 178 is further positioned along the length of bottom face surface 136.

The thin sheet forming front joist 178 does not cover the entire opening formed upon top face surface 130 by through-hole 154; rather, an enlarged, slotted opening extending through the sheet forming front joist 178 is positioned over the opening defined by through-hole 154.

The perspective view of FIG. 1 further illustrates card wafer 180. Card wafer 180 comprises a card member corresponding to the D-Net-sized card member of GSM specification numbers ISO-710 through 8716. Electrodes 184 are disposed upon top face surface 188 of card wafer 180. A memory element indicated by block 192 is disposed upon or within card wafer 180 and is appropriately connected to electrodes 184. Electrodes 184 are disposed at locations upon top face surface 188 corresponding to the locations specified in the previously-noted International Standard.

The memory element of card wafer 180, comprising a D-Net-sized card member, as previously noted, contains identification indicia used during operation of a radio telephone. When such D-Net-sized card member is received by a radio telephone having a corresponding D-Net-sized card reader assembly, the information contained in the memory of card wafer 180 is supplied to the radio telephone.

Because, as noted previously, such a D-Net-sized card member may be used with any radio telephone having a corresponding card reader assembly constructed to receive such card member, a user can alternately operate, while requiring only a single billing number, any radio telephone having such type of card reader assembly.

However, as also noted previously, card members, and card reader assemblies operative to receive such card members, are of at least two different, standardized configurations. In addition to the D-Net-sized card member (i.e., the card member of reduced dimensions), another standardized configuration of card member also exists, the C-Net-sized card member (i.e., the standard-sized card member).

While the card member of the reduced dimensions may be inserted into a card reader assembly constructed to be operative to receive a C-Net-sized card (i.e., a card member of standard dimensions), alignment of the electrodes of the card member of the reduced dimensions with corresponding electrodes of the card reader assembly constructed to be operative to receive the standard-sized card member can only be effected with considerable difficulty.

Insertion of a card member of the reduced dimensions, represented in the Figure by card wafer 180, into through-hole 154 of support assembly 100 facilitates connection of the electrodes of the card member of the reduced dimensions with corresponding electrodes of a card reader assembly constructed to be operative to receive a standard-sized card member. Because the dimensions of the card member comprising frame 106 corresponds to the dimensions of a standard-sized card member, support assembly 100 of FIG. 1 aligns electrodes 184 of card wafer 180 with corresponding electrodes of such card reader assembly.

FIG. 2 is a perspective view of support assembly 100 of FIG. 1 taken from beneath the assembly. As noted briefly hereinabove, the thin sheet placed upon top face surface extends to edge surface 148 to be folded thereabout such that a second portion of the thin sheet extends along bottom face surface 136. Such second portion forms rear joist 196 which covers the opening formed upon bottom face surface 136 of frame 106 formed by through-hole 154. Rear joist 196, in the preferred embodiment illustrated in the Figure, covers substantially the entire opening upon bottom face surface 136 defined by through-hole 154 but for aperture 198. Aperture 198 extends through the support sheet comprising rear joist 196 overtop the opening defined by through-hole 154.

Figure 3:
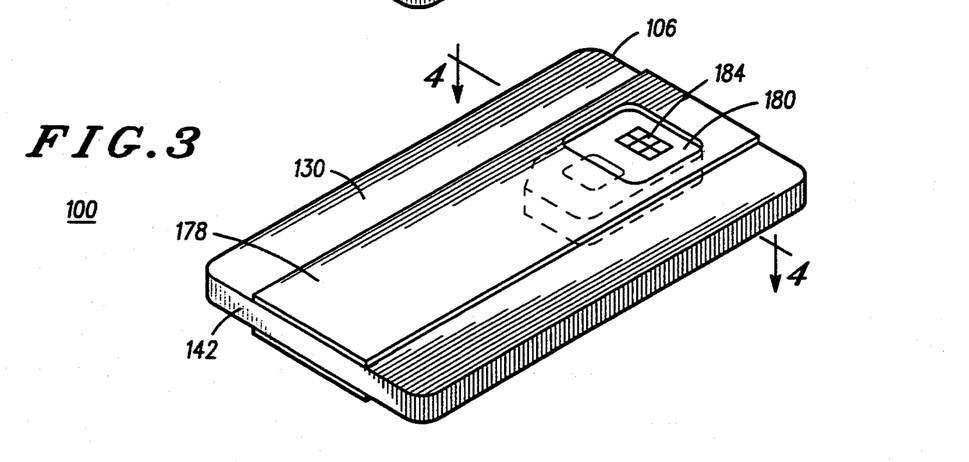
FIG. 3 is a perspective view, similar to that shown in FIG. 1, but illustrating the card member of reduced dimensions positioned in the pocket formed by the front and rear joists of the support assembly.

FIG. 3 is a perspective of support assembly 100 taken from above the support assembly, similar to that of FIG. 1 but here illustrating the relationship between card member 180 and the support assembly once card wafer 180 is inserted into the through-hole formed to extend between the opposing face surfaces 130 and 136 of frame 106.

Card wafer 180 is positioned within through-hole 154 by inserting the card wafer through slotted opening 182 of front joist 178 such that, once positioned within through-hole 154, top face surface 188 is positioned at a height similar to that of top face surface 130 of frame 106. Electrodes 184 formed upon top face surface 188 of card wafer 180 are positioned at slotted opening 182.

Card wafer 180 is supported in such position within through-hole 154 by front and rear joists 178 and 196, respectively, formed of the thin support sheet positioned upon the opposing face surfaces of frame 106. As the perimeter of through-hole 154 corresponds to, but is slightly greater than, the outer perimeter of card wafer 180, electrodes 184 of card wafer 180 are maintained in a desired orientation.

Support assembly 100, containing the card wafer 180 may be inserted into a card reader assembly constructed to be operative to receive a standard-sized card member to connect electrodes 184 of card wafer 180 with corresponding electrodes of the card reader assembly. A radio telephone having such card reader assembly may then be utilized to place and to receive calls billed to the billing account identified by the information stored in the memory of card wafer 180.

When a radio telephone is constructed to include a card reader assembly constructed to be operative to receive a card member of reduced dimensions, card wafer 180 may be removed from frame 106 to be inserted thereafter directly into such type of card reader assembly. To facilitate removal of card wafer 180 from support assembly 100, a removal force may be applied to a back face surface of card wafer 180 through aperture 198, illustrated in FIG. 2, extending through rear joist 198.

Figure 4:
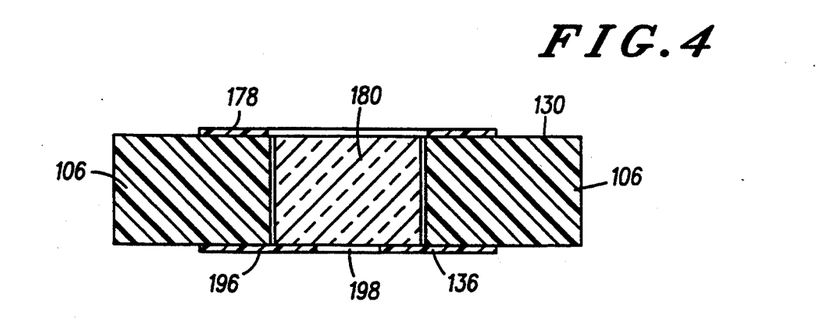
FIG. 4 is a sectional view, taken along lines IV—IV of FIG. 3.

FIG. 4 is a sectional view of support assembly 100 of the preceding Figures taken along line IV—IV of FIG. 3. The relationship between the portions of the card member comprising frame 106 and the thin support sheet forming front and rear joists 178 and 196 to card wafer is shown.

The support sheet comprising front and rear joists 178 and 196 is of a thickness much less than the thickness of frame 106. Preferably, such sheet is of a thickness of less than 0.004 inches. As the thickness of the standard-sized card member (here, the C-Net-sized card member) and the thickness of the card member of reduced dimensions (here, the D-Net sized card member) is specified in the previously-noted, International Standard, the thickness of the support sheet forming the front and rear joists 178 and 196 must be minimized to affect as little as possible the thickness of support assembly 100.

Conventional card reader assemblies are constructed to receive card members by sliding such card members along a longitudinal axis into the card reading assembly. Such motion exerts a force upon the electrodes disposed within the card reader assembly. When the thickness of the card member is increased (here, such increase in the thickness of the card member is a result of the thickness of the front and rear joists 178 and 196), the amount of force applied to such electrodes is correspondingly increased. By suitable selection of the location of aperture 198 formed to extend through rear joist 196, the thickness of the card member whereat the electrodes of the card reader assembly engage with corresponding electrodes disposed upon card wafer 180 corresponds to the thickness of only the card wafer 180.

It should also be noted that support assembly 100 may also be utilized to facilitate storage of the card member of the reduced dimensions. Because the support assembly is of dimensions corresponding to the dimensions of a standard-sized card member, such support assembly may be stored in a manner similar to the manner in which conventional, charge cards are stored. By inserting the card member of the reduced dimensions into the support assembly to be supported therein, the card member of the reduced dimensions may also be stored in the manner similar to the manner in which conventional, charge cards are stored.

Figures 5, 7:
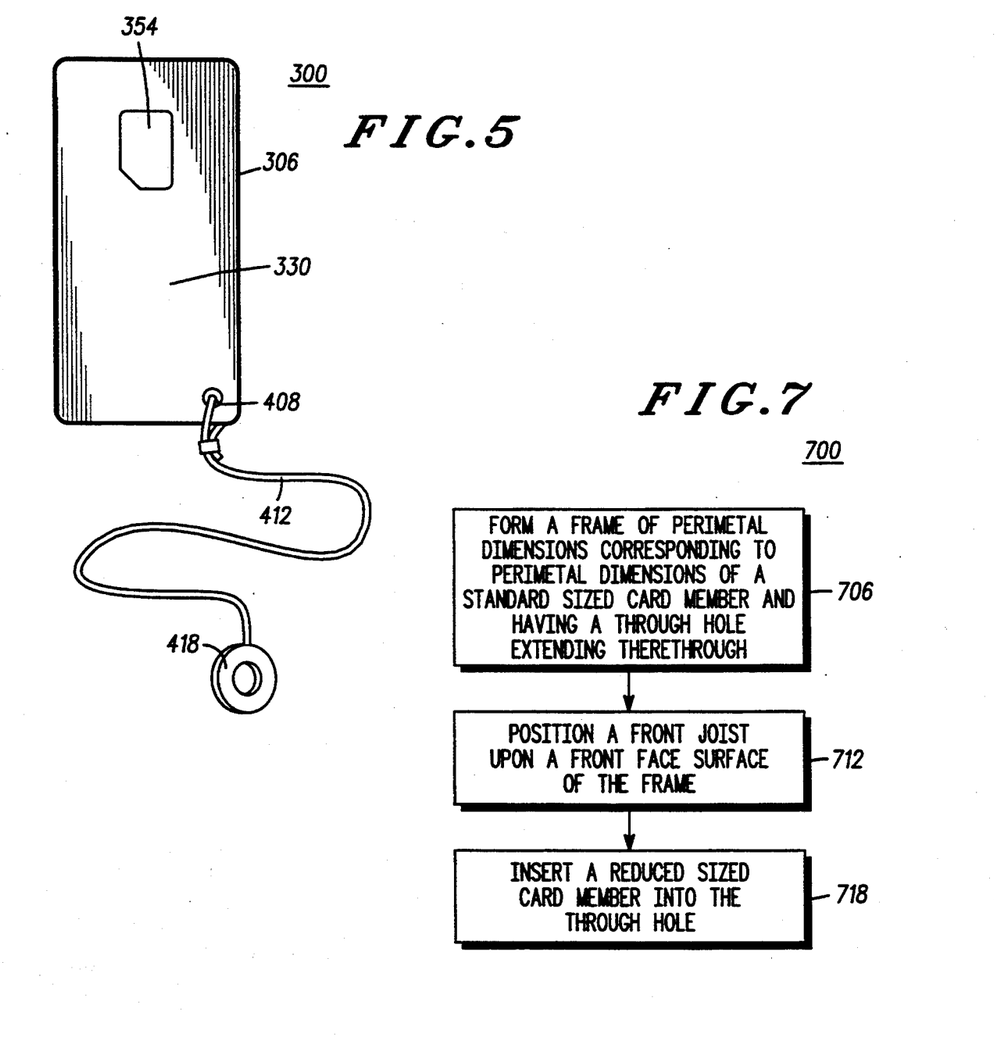
FIG. 5 is a plan view of the support assembly of an alternate, preferred embodiment of the present invention.
FIG. 7 is a logical flow diagram listening the method steps of the method of a preferred embodiment of the present invention.

Turning next to the plan view of FIG. 5, a support assembly, referred to generally by reference numeral 300, of an alternate, preferred embodiment of the present invention is shown. Support assembly 300 is similar in construction and dimensions with that of support assembly 100 shown in the preceding Figures. Support assembly 300 again is comprised of a frame, here designated by reference numeral 306, and a through-hole, here designated by reference numeral 354, extending between the top and bottom surfaces of frame 306. (In the plan view of FIG. 5, only top face surface 330 is illustrated.)

In the embodiment of FIG. 5, support assembly 300 further comprises aperture 408 formed to extend between the top and bottom face surfaces of frame 306. Aperture 408 is operative to form a portal for receiving a portion of lanyard 412. Lanyard 412 is knotted to maintain the lanyard and frame member 306 in engagement with one another. A second side of lanyard 412 is coupled to mounting apparatus, here washer 418. A threaded shaft member, not shown, may then be utilized to affix washer 418 to the housing of a radio telephone or to any mounting structure maintained proximate to a radio telephone, thereby to maintain support assembly 300 in a desired proximity to the radio telephone.

A user wishing to utilize a radio telephone may insert a card member of reduced dimensions into through-hole 354, and then insert support assembly 300 into a card reader assembly constructed to receive a standard-sized card member.

Figure 6:
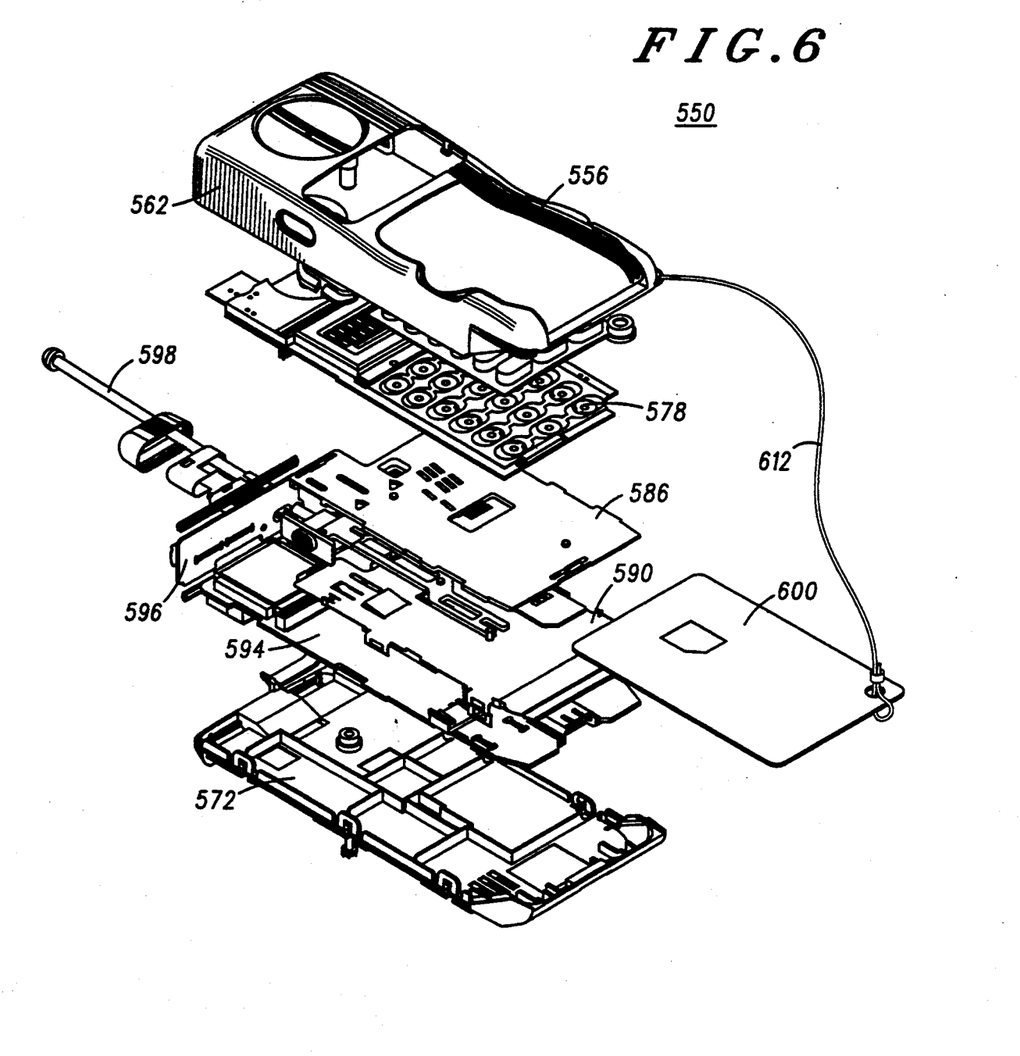
FIG. 6 is an exploded view of a radio telephone having a card reader assembly operative to receive a standard-sized card member forming a portion thereof.

FIG. 6 is an exploded view of a radio transceiver, here a portable, cellular radio telephone, referred to generally by reference numeral 550. Radio telephone 550 includes, as a portion thereof, a card reader assembly, constructed to be operative to receive a standard-sized card member. Support assembly 100 or 300 of the preferred embodiments of the present invention shown in the preceding Figures may be utilized to permit operation of radio telephone 550 with a card member of reduced dimensions.

Radio telephone 550 includes a supportive housing structure for supporting various components of the radio telephone therewithin. Top housing portion 556 of the housing structure includes sidewall flanges extending about portions of an outer perimeter of a top face surface of the housing structure. Rear housing 572 also forms a portion of the housing assembly and also includes flange portions formed about perimetal portions thereof which form sidewalls which matingly engage with corresponding sidewalls 562 extending about top housing portion 556.

Keypad circuit board 578 is positioned directly beneath front housing 556. Component portions of a card reader assembly, here shown to be comprised of slider plate 586 and cover plate 590, constructed to be operative to receive a standard-sized card member, are positioned directly beneath key pad circuit board 578.

Transceiver circuit board 594 is positioned beneath cover plate 590 of the card reader assembly. Antenna circuit board 596 is positioned at an end side surface of transceiver circuit board 594. Antenna 598 which is supported to protrude beyond antenna circuit board 596 is also shown in the figure.

Support assembly 600 which corresponds to support assembly 300 of FIG. 5, is further illustrated in the figure. A card member of reduced dimensions supported within support assembly 600 may be used to permit operation of radiotelephone 550. Lanyard 612 connected on one side thereof to frame 606 of support assembly 600 and at a second end thereof to housing portion 556 by mounting apparatus (not shown in the Figure), is also illustrated in the Figure. Support assembly 600 could, of course, alternately be comprised of assembly 100 shown in FIGS. 1-4.

Turning finally now to FIG. 7, the logical flow diagram, referred to generally by reference numeral 700, lists the method steps of the method of the preferred embodiment of the present invention.

First, and as indicated in block 706, a frame of perimetal dimensions corresponding to perimetal dimensions of a standard-sized, card member is formed. A through-hole extends through such frame. Next, and as indicated in block 712, a front joist is positioned upon the front face surface of the frame. Finally, and as indicated in block 718, the reduced-sized, card member is inserted into the through-hole extending through the frame.

In such manner, a card member of reduced dimensions may be utilized to permit operation of a radiotelephone having a card reader assembly constructed to be operative to receive a standard-sized card member.

While the present invention has been described in connection with the preferred embodiments shown in the various figures, it is to be understood that other similar embodiments may be used and modifications and additions may be made to the described embodiments for performing the same function of the present invention without deviating therefrom, Therefore, the present invention should not be limited to any single embodiment, but rather construed in breadth and scope in accordance with the recitation of the appended claims.

What is claimed is:

1. A support assembly for supporting an electrical circuit disposed upon a card wafer, the card wafer of outer perimetal dimensions and the electrical circuit having coupling electrodes disposed upon a face surface of the card wafer, said support assembly comprising:

a frame formed of a card member defining a front face surface and a rear face surface, and having a through-hole, defined by opposing inner sidewalls of opposing side portions of the card member, extending at least a portion of the distance between the front face surface and the rear face surface of the card member thereby to form an opening upon at least the front face surface of the card member, the opposing side portions of the card member together defining an inner perimeter, the inner perimeter having dimensions sized according to the outer perimetal dimensions of the card wafer sufficient to permit positioning of the card wafer within the through-hole such that the face surface of the card wafer upon which the coupling electrodes are formed is positioned at the front face surface of the card member, wherein the through-hole extends between the top face surface and the bottom face surface, thereby also to form an opening upon the bottom face surface of the card member;

a front joist positioned upon the front face surface of the card member forming said frame, the front joist for covering at least a portion of the opening formed upon the front face surface by the through-hole extending through the card member and for supporting, thereby, the card wafer in position when positioned within the through-hole wherein the front joist further comprises a slotted opening formed to extend therethrough, the slotted opening extending through a portion of the front joist positioned over at least one of the opening defined by the through-hole thereby to permit insertion of the card member therethrough to position the card wafer within the through-hole; and a rear joist positioned upon the rear face surface of the card member forming the frame, the rear joist for covering at least a portion of the opening formed upon the rear face surface by the through-hole extending through the card member, wherein the front joist and the rear joist together form a pocket to support the card wafer in position within the through-hole, wherein the rear joist further comprises an aperture formed to extend therethrough at a portion of the rear joist positioned over the opening upon the rear face surface of the card member, said aperture for permitting application of a removal force to be applied to the card wafer when positioned within the through-hole.

2. The support assembly of claim 1 wherein the card member forming said frame is of a thickness essentially equal to a corresponding thickness of the card wafer.

3. The support assembly of claim 1 wherein the inner perimeter defined by the opposing side portions of the card member forms an essentially rectangular configuration.

4. The support assembly of claim 3 wherein the inner perimeter forming the essentially rectangular configuration further comprises a notched corner portion.

5. The support assembly of claim 1 wherein the front joist further comprises an opening extending therethrough, the opening extending through the front joist at a portion of the front joist positioned over the opening defined by the through-hole extending through the card member such that, when the card wafer is positioned within the through-hole, the electrodes formed upon the face surface of the card wafer, are positioned at the opening extending through the front joist.

6. The support assembly of claim 1 wherein the front joist is comprised of a fiat, support sheet.

7. The support assembly of claim 1 wherein the front joist is comprised of a fiat, support sheet.

8. The support assembly of claim 7 wherein the rear joist is comprised of a fiat support sheet.

9. The support assembly of claim 8 wherein the front and rear joists, respectively, are comprised of a single support sheet having a first portion and a second portion, wherein said first portion of the single support sheet comprises the front joist and the second portion of the single support sheet comprises the rear joist, and wherein the single support sheet is folded over an edge surface of the card member forming the frame.

10. In the radiotelephone assembly having transmitter and receiver circuitry and a standard-sized, card-receiving apparatus housing within a housing, including the standard-sized, card-receiving apparatus for receiving a memory element disposed upon a standard-sized card member at a support position therein such that, when the standard-sized card member is positioned at the support position, electrical contacts disposed within the card-receiving apparatus contact with corresponding contacts connected to the memory element, a combination with the standard-sized, card-receiving apparatus a support structure for supporting a memory element disposed upon a reduced-sized card member of outer perimetal dimensions to permit reception of the reduced-sized card member by the standard-sized card receiving apparatus, said support structure comprising:
 a frame of perimetal dimensions corresponding to perimetal dimensions of a standard-sized, card member and defining a front face surface and a rear face surface, and having a through-hole, defined by opposing inner sidewalls of opposing side portions, extending a least a portion of the distance between the front face surface and the rear face surface thereby to form an opening upon at least the front face surface, the opposing side portions together defining an inner perimeter, the inner perimeter having dimensions sized according to the outer perimetal dimensions of the reduced-sized card member sufficient to permit positioning of the reduced-sized card member within the through-hole such that a face surface of the reduced-sized card member upon which the contacts are formed is positioned at the front face surface; and
 a front joist positioned upon the front face surface of the frame, the front joist for covering at least a portion of the opening formed upon the front face surface by the through-hole extending through the frame and for supporting, thereby, the reduced-sized card member in position when positioned within the through-hole.

11. In the radiotelephone assembly of claim 10, a further combination with the standard-sized card-receiving apparatus of means for maintaining the frame in a desired proximity to the standard-sized, card-receiving apparatus.

12. In the radiotelephone assembly of claim 11, the combination with the standard-sized, card receiving apparatus wherein said means for maintaining comprises a flexible cord, wherein the flexible cord is coupled at a first side thereof to the frame and affixed at a second side thereof at a location maintained in a fixed relation to the standard-sized, card-receiving apparatus.

13. In the radiotelephone assembly of claim 12, the combination with the standard-sized, card-receiving portal for receiving the first side of the flexible cord.

* * * * *

UNITED STATES PATENT AND TRADEMARK OFFICE
CERTIFICATE OF CORRECTION

PATENT NO. : 5,420,759
DATED : May 30, 1995
INVENTOR(S) : Charlier et al.

It is certified that error appears in the above-indentified patent and that said Letters Patent is hereby corrected as shown below:

Column 11, lines, 2, 4, and 6
In claims 6, 7 and 8, please replace the word "fiat" with --flat--.

Signed and Sealed this

Twenty-sixth Day of December, 1995

Attest:

BRUCE LEHMAN

*Attesting Officer*    *Commissioner of Patents and Trademarks*